United States Patent Office 3,726,905
Patented Apr. 10, 1973

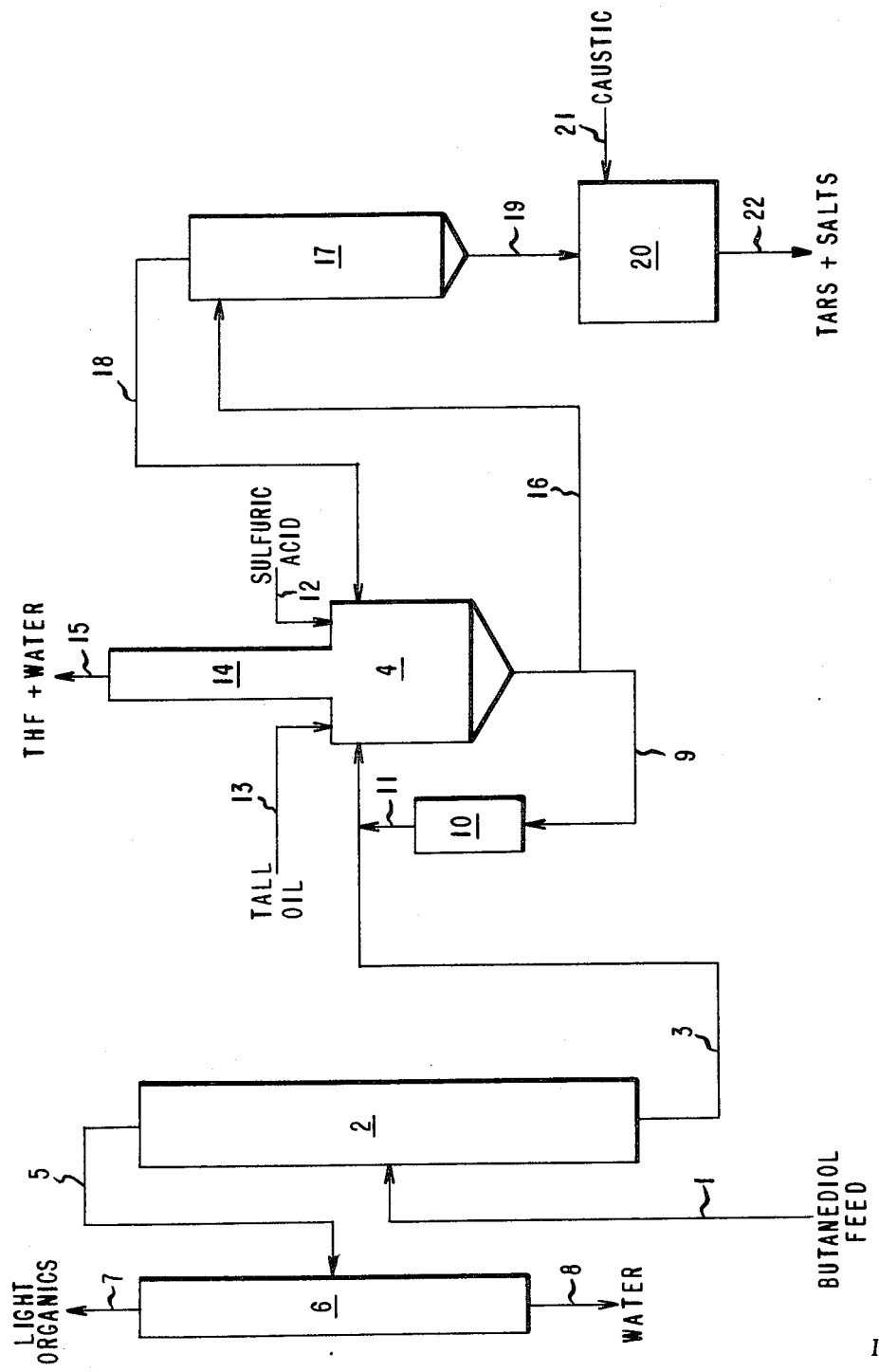

3,726,905
CONVERSION OF BUTANEDIOL TO TETRAHYDROFURAN IN THE PRESENCE OF TALL OIL
John S. Coats, Houston, and Victor J. Reilly, Seabrook, Tex., assignors to E. I. du Pont de Nemours and Company, Wilmington, Del.
Filed July 1, 1971, Ser. No. 158,866
Int. Cl. C07d 5/02
U.S. Cl. 260—346.1 R       14 Claims

ABSTRACT OF THE DISCLOSURE

Butanediol is converted to tetrahydrofuran by reacting a feed stream containing, by weight, about 1 to 20 percent water, about 80 to 99 percent butanediol, and about 0.05 to 5 percent combined high boiling organic tars and alkali or alkaline earth metal salts with 5 to 25 percent by weight of sulfuric acid in the presence of tall oil containing less than about 95 percent by weight of fatty acids and having an acid number of less than about 195 in an amount sufficient that the reaction medium contains 2 to 60 percent by weight of tall oil. The presence of tall oil improves the conversion of butanediol to tetrahydrofuran in the primary reactor and allows recovery of increased amounts of tetrahydrofuran from a purge stream using a wiped film evaporator.

BACKGROUND OF THE INVENTION (1) Field of the invention

This invention relates to the production of tetrahydrofuran by the dehydration and cyclization of butanediol using sulfuric acid.

(2) Description of the prior art

It is well known that tetrahydrofuran can be produced by a series of reactions starting with the reaction of aqueous formaldehyde and acetylene in the presence of a cuprous acetylide complex to form butynediol. An alkaline material such as the carbonate, bicarbonate or hydroxide of an alkali or alkaline earth metal is commonly added to this reaction to control pH. This alkaline material generally reacts with the formic acid generated in this reaction to form the metal formate. The product of this reaction is then passed to a hydrogenation step where the butynediol is converted to butanediol.

The aqueous product stream from the hydrogenator is then concentrated to form a butanediol feed stream, typically containing, by weight, about 3 percent water, about 95–96 percent butanediol, and about 0.5–2 percent combined high boiling organic tars and alkali metal or alkaline earth metal salts. The butanediol is then converted to tetrahydrofuran using about 10 percent sulfuric acid. This reaction is carried out under temperature conditions which allow recovery of tetrahydrofuran and water overhead from the reactor. At equilibrium the reaction medium in the reactor typically contains about 50–60 percent unconverted butanediol, about 10 percent acid, about 10 percent water, and about 25 percent combined tars and salts. In order to prevent build-up of tars and salts in the reactor, it is necessary to remove a purge stream from the reactor. This purge stream is typically about 5 percent by weight of the concentrated butanediol stream fed to the reactor. The purge stream is passed to a wiped film evaporator where an attempt is made to convert further amounts of butanediol to tetrahydrofuran. However, because of the high content of tars and salts in the purge stream, line pluggage problems are encountered if temperatures in the wiped film evaporator are raised more than slightly above those in the primary reactor. As a result of this temperature limitation only about 5 percent of the butanediol fed to the wiped film evaporator is recovered as tetrahydrofuran. The unconverted butanediol is discharged from the wiped film evaporator and sent to waste disposal along with the tars and salts.

SUMMARY OF THE INVENTION

It has now been discovered that improved conversion of 1,4-butanediol to tetrahydrofuran can be obtained in the reaction of a feed stream containing, by weight, about 1 to 20 percent water, about 80 to 99 percent 1,4-butanediol, and about 0.05 to 5 percent combined high boiling organic tars and alkali or alkaline earth metal salts with about 5 to 25 percent by weight of sulfuric acid by the improvement which comprises adding tall oil containing less than about 95 percent by weight of fatty acids and having an acid number of less than about 195 to the reaction in an amount sufficient that the reaction medium contains about 2 to 60 percent by weight of tall oil. It has been found that the presence of this particular type of tall oil increases the rate of conversion of butanediol to tetrahydrofuran such that the unconverted butanediol content of the reaction medium at equilibrium is reduced from about 55 percent to about 35 percent. The presence of the tall oil also has a favorable effect upon the purge stream in the wiped film evaporator such that about 50–95 and preferably 75–95 percent of the butanediol fed to the evaporator can be recovered as tetrahydrofuran. Surprisingly, it has been found that these tall oils are stable in the presence of the high concentrations of sulfuric acid encountered in this reaction and none of the components of these tall oils are found to contaminate the tetrahydrofuran product obtained in accordance with this invention.

DETAILED DESCRIPTION OF THE INVENTION

The drawing is a schematic illustration of a preferred embodiment of the invention. In this preferred embodiment butanediol feed containing about 50 percent by weight water and about 0.5 to 2 percent combined tars and salts, which may be obtained from the hydrogenation of butynediol, is passed via line 1 to concentrator column 2. From concentrator column 2 a concentrated butanediol stream containing, by weight, about 3 percent water, 95 to 96 percent, 1,4-butanediol, and about 0.5 to 2 percent combined tars and salts is recovered as bottoms and passed via line 3 to primary reactor 4. An overhead stream containing water and light organics, mainly n-butanol and some methanol, is recovered from concentrator column 2 via line 5 and passed to butanol column 6. In butanol column 6 the light organics are recovered as overhead via line 7 and water is discharged as bottoms via line 8.

The concentrated butanediol feed is fed tangentially into reactor 4 which is maintained at about 125° C. by circulating the reaction mass via line 9 through heat exchanger 10 and returning it to reactor 4 via lines 11 and 3. Sulfuric acid is added to reactor 4 via line 12 in an amount sufficient to maintain a sulfuric acid concentration of about 10 percent by weight in the reaction medium. Tall oil is added to reactor 4 via line 13 in an amount sufficient that the reaction medium contains about 25 percent by weight of tall oil. Tetrahydrofuran and water is refluxed in reactor column 14 and recovered via line 15 as a mixture containing about 70 percent by weight tetrahydrofuran and about 30 percent by weight of water. The equilibrium mixture in reactor 4 contains, by weight, about 35 percent butanediol, 10 percent sulfuric acid, 5 percent water, 25 percent combined tars and salts, and about 25 percent tall oil. Reactor purge is removed from reactor 4 via line 16 in an amount sufficient to maintain the concentration of tars and salts in reactor 4 at about 25 percent by weight. This purge stream amounts to about 5 percent by weight of the concentrated butanediol feed charged to the reactor via line 3.

The reactor purge is passed via line 16 to wiped film evaporator 17. The walls of the wiped film evaporator are maintained at about 150° C. which promotes continued conversion of butanediol to tetrahydrofuran. About 75–95 percent by weight of the butanediol fed to evaporator 17 is converted to tetrahydrofuran which passes out of evaporator 17 along with water coproduced in the cyclization/dehydration reaction and is returned to reactor 4 via line 18. Tars, salts, and unconverted butanediol pass from evaporator 17 via line 19 to neutralizer 20. Sodium hydroxide is supplied to neutralizer 20 via line 21. In neutralizer 20 the residue is made neutral-to-alkaline and the residue is removed from the system via line 22.

It can be seen from this preferred embodiment that substantial process improvements can be accomplished by the use of tall oil. The equilibrium mixture in reactor 4 contains only about 35 percent unconverted butanediol whereas, in the absence of tall oil, it contains about 55 percent by weight unconverted butanediol. As a result of this improved conversion, the product stream obtained via line 15 contains a greater percentage of tetrahydrofuran, while the purge stream contains a smaller percentage of unconverted butanediol. Moreover, in the presence of tall oil, the wiped film evaporator converts about 75–95 percent of the butanediol fed to it to tetrahydrofuran whereas, in the absence of tall oil, only about 5 percent of the butanediol was converted to tetrahydrofuran. The presence of tall oil also gives an added advantage in that substantially no plugging of the system by tars and salts is encountered. In the absence of tall oil pluggage of reactor 4, heat exchanger 10, wiped film evaporator 17, and neutralizer 20 as well as the lines associated with these vessels is often encountered.

A wide degree of variation from the preferred embodiment illustrated above is possible in accordance with this invention. The concentrated butanediol feed stream supplied to reactor 4 via line 3 may contain, by weight, about 1 to 20 percent water, about 80 to 99 percent 1,4-butanediol, and about 0.05 to 5 percent combined high boiling organic tars and alkali or alkaline earth metal salts. Preferably, the feed stream contains 3 to 6 percent water, 94 to 97 percent butanediol, and 0.5 to 3 percent combined tars and salts. The content of tars and salts is given in combination since no separation or analysis of this residue is generally made.

Suitable alkali metals include sodium, potassium, lithium, and the like. Suitable alkaline earth metals include magnesium, calcium, barium, and the like. Sodium and calcium are the preferred metals, while sodium is the most preferred. Generally the salts are mainly present as formates, although some carbonates, bicarbonates and hydroxides may also be present. The exact form of the salts is not important since they are all converted to sulfates upon contact with sulfuric acid in the primary reactor.

The concentration of sulfuric acid in the reaction medium in the primary reactor may vary from about 5 to 25 percent by weight. Preferably, the sulfuric acid concentration is about 6 to 15 percent by weight.

The tall oil which is added in accordance with this invention must contain less than about 95 percent by weight of fatty acids and must have an acid number of less than about 195. A wide variety of tall oils meeting these requirements are available as standard articles of commerce. Tall oils are by-products obtained by the acid treatment of the alkaline liquors from the digesting of pine wood. They typically contain fatty acids such as oleic, linoleic, palmitic, and the like; resin acids such as pimaric, secodehydroabietic, abietic, neoabietic, levopimaric, palustric, pimaric, and the like; and high boiling unsaponifiable material such as decarboxylated fatty and resin acids, terpenes, sterols, alcohols, ketones, lactones, and the like. Commercially available tall oils vary from crude tall oil to highly refined tall oil. In accordance with this invention it has been found that highly refined tall oils containing more than about 95 percent by weight of fatty acids or having an acid number greater than about 195 are not suitable for use in that they do not give benefits in accordance with this invention. Preferably, the tall oil contains less than about 90 percent by weight of fatty acids and has an acid number of less than about 190. Most preferably, the tall oil has an acid number of less than about 185. The acid numbers specified herein represent the number of milligrams of potassium hydroxide required to neutralize the free acids in a gram of tall oil.

The amount of tall oil which is added to the reaction may vary over wide limits. The tall oil should be added in an amount sufficient that the reaction medium contains about 2 to 60 percent by weight of tall oil. Preferably, the reaction medium contains about 10 to 40 percent by weight of tall oil.

The dehydration and cyclization of butanediol is carried out in the presence of sulfuric acid at temperatures of about 100° to 150° C. Although this reaction is somewhat exothermic, heat must be supplied to the reactor to provide the heat of vaporization required to remove tetrahydrofuran and water as overhead from reactor column 14. This heat is conveniently supplied by circulating reaction medium through heat exchanger 10. Preferably the reaction is carried out at ambient pressure. Of course, pressures above or below ambient may be used, if desired.

The amount of purge removed from the primary reactor will be the amount necessary to maintain the desired level of organic tars and inorganic salts in the reactor. Generally, the combined tars and salts are maintained at about 10 to 40 percent by weight of the reaction medium in the primary reactor. Preferably, the combined tars and salts are maintained at about 20 to 30 percent.

The temperature of the wiped walls in the wiped film evaporator may vary from about ambient to 200° C. The higher the temperature, the greater will be the conversion of butanediol to tetrahydrofuran. However, higher temperatures also increase the chance of pluggage of the evaporator or associated equipment due to carbonization of the organic tars and concentration of the salts. Preferably, the temperature of the wiped walls of the evaporator is maintained at about 125° to 150° C.

The method of operating illustrated in the drawing may be varied somewhat. For example, it is not necessary that a wiped film evaporator be used as the secondary reactor. Other forms of secondary reactors could be employed or the use of a secondary reactor could be dispensed with altogether. Thus, in one aspect the invention resides in the use of tall oil in the primary reactor alone.

In another aspect of the invention, the primary reactor is operated in the absence of tall oil as in the prior art and tall oil is added to the wiped film evaporator, either directly to the evaporator or to the purge stream before it enters the evaporator. In this embodiment the butanediol feed stream to the evaporator contains, by weight, about 5 to 25 and preferably about 6 to 15 percent sulfuric acid, about 30 to 70 and preferably about 40 to 60 percent 1,4-butanediol, about 1 to 50 and preferably about 10 to 40 percent combined high boiling organic tars and alkali or alkaline earth metal salts, and about 1 to 30 and preferably about 5 to 20 percent water. Tall oil is added to the evaporator in an amount sufficient that about 2 to 60 and preferably about 10 to 40 percent by weight of the total feed to the evaporator is tall oil.

The following examples, illustrating the novel process disclosed herein, are given without any intention that the invention be limited thereto. All parts and percentages are by weight unless otherwise specified.

EXAMPLES 1-8

The reactors used in these examples were 250 ml., 3-necked flasks equipped with high-speed mechanical stirrers, immersion thermometers and a Dean-Stark trap fitted with a water-cooled condenser for product take-off. Heat was applied by wrapping the flasks with electric heating tapes run by means of variable-voltage controllers. The flasks were equipped with drain stopcocks at the bottoms for tar and salt removal.

The tared reactors were charged with 155 grams of a mixture containing approximately 20 percent tars and salts, 12 percent sulfuric acid, 55 percent 1,4-butanediol, and the remainder water and lower alcohols. To this mixture was added 8 drops of antifoam and about 50 grams of the various tall oils listed in the table. The stirrer was turned on to its maximum speed and heat was applied by means of the heating tape with the controller set at 110 volts. The temperature of the reaction mass rose rapidly and the first drops of clear distillate were collected after approximately 8 minutes, or after the reactor temperature reached approximately 100° C. The temperature climbed rapidly to 118°–122° C. and remained at that point throughout the major portion of the reaction. As the butanediol content of the reaction medium became exhausted, the temperature again began to rise rapidly. At 150° C. the heat and stirring was stopped and the bottom drain opened and the fluid reactants flowed from the open stopcock into a tared beaker. The total elapsed time for the reaction was about 35 minutes. The black tar remaining in the reactor solidified rapidly on cooling. The reactor was reweighed and the ratio of tar remaining in the reactor to the pourable medium was designated as the "char value" of this reaction.

A description of the various tall oils used and the results obtained are given in the table.

TABLE I

| Example | 1 | 2 | 3 | 4 | 5 | 6 | 7 | 8 |
|---|---|---|---|---|---|---|---|---|
| Fatty acids, percent | 92.5 | 70.2 | 86 | 63 | 84.8 | 79 | 74-76 | 57 |
| Resin acids, percent | 3.5 | 28 | 0 | 28 | 0.5 | 9.8 | 0.8-3.3 | 12 |
| Unsaponifiable materials, percent | 4.0 | 1.0 | 14 | 1.5 | 14.7 | 11.6 | 22-27 | 32 |
| Acid number | 190 | 187 | 178 | 165 | 175 | 174 | 151-159 | 130 |
| Tall oil in reactor, percent | 23.7 | 24.4 | 23.2 | 24.4 | ¹23.5 | 24.8 | ¹24.5 | ¹25.8 |
| "Char value" | 59 | 22.7 | 13.3 | 11 | ¹9.9 | 9.6 | ¹8.3 | ¹4.7 |

¹ Average of two runs.

For comparison, Example 1 was repeated except that tall oil was not added. When the bottom drain was opened at the end of the reaction, no reactants flowed from the open stopcock. The reactor was quickly dismantled and the mobile portion of the residual tar was poured into a tared beaker. Eight ounces of black tar remained in the reactor. The car value was 78.4 percent.

For further comparison, Example 1 was again repeated using a tall oil containing 98.4 percent fatty acids, 0.7 percent resin acids and 0.9 percent unsaponifiable materials and having an acid number of 197. The reaction gave a char value of 93.8 percent.

EXAMPLE 9

This example was carried out in equipment similar to that illustrated in the drawing. Prior to beginning the test with tall oil, the reactor was maintained at steady-state conditions, running on a crude feed mixture containing 96 percent 1,4-butanediol, 3 percent water, and 1 percent combined high boiling organic tars and inorganic salts, mainly calcium formate. Sulfuric acid was added to the reactor in sufficient quantity to maintain its concentration at approximately 8–10 percent. The reactor purge system was operating at a rate sufficient to maintain the high boiling organic tars and inorganic salts in the reactor at approximately 20–25 percent by weight. After equilibrium was reached the average concentration of 1,4-butanediol in the primary reactor was approximately 60 percent by weight. The purge stream amounted to about 5 percent by weight of the butanediol feed stream to the primary reactor. The wiped film evaporator, which was equipped with two steam jackets, was running, but only enough heat was applied to maintain a temperature of 100° to 125° C., since previous experience had shown that the unit and its attendant lines and valves would plug rapidly if the evaporator was heated beyond that point. About 8 percent of the butanediol supplied to the evaporator was converted to tetrahydrofuran and returned to the primary reactor. Overall about 3 percent of the 1,4-butanediol fed to the reactor system was lost in the purge.

A quantity of tall oil, containing 70.2 percent fatty acids, 28 percent resin acids, and 1.8 percent unsaponifiable materials and having an acid number of 187 was added to the primary reactor in amounts sufficient to maintain its concentration at approximately 13 percent by weight. When steady-state was again reached with tall oil present, the average concentration of 1,4-butanediol in the primary reactor was approximately 35 percent by weight. The purge stream again amounted to about 5 percent by weight of the butanediol feed stream to the primary reactor. The wiped film evaporator was operated at gradually increasing temperatures, thereby increasing the conversion of purged 1,4-butanediol to tetrahydrofuran from 8 to 73 percent. No pluggage of tar lines, valves, or the evaporator itself was observed. The tetrahydrofuran produced during this test was analyzed by gas chromatography and found to be identical with that produced during steady-state operation without tall oil present. The amount of 1,4-butanediol lost in the wiped film evaporator in this case was only 0.5 percent by weight of that fed to the primary reactor as compared to about 3 percent by weight when tall oil was not present.

EXAMPLE 10

This example is essentially a repeat of the test described in Example 9 with the exception that the primary reactor feed contained sodium formate, rather than calcium formate as the main salt component. Previous attempts to operate this process on sodium-containing feeds led to rapid fouling of the heat exchanger, leading to loss of reactor circulation rate, necessitating cleanout of the heat exchanger. The secondary reactor, or wiped film evaporator, had never processed sodium-containing feeds successfully, and all 1,4-butanediol fed to it was lost with the tars and salts.

For the purpose of this test, the primary reactor was charged with from 15–20 percent by weight of tall oil containing 70.2 percent fatty acids, 28 percent resin acids, and 1.8 percent unsaponifiable materials and having an acid number of 187, the sodium-containing butanediol feed, and sulfuric acid in the same manner as in Example 9. When the reactor system reached steady-state, a purge, which amounted to about 5 percent by weight of the butanediol stream fed to the primary reactor, was begun to maintain the tars and salts at the desired level of 20–25 percent by weight. This purge stream was fed to the wiped film evaporator and the temperature of this secondary reactor was gradually increased to yield a conversion of up to 75 percent of the butanediol fed to the evaporator, with no evaporator pluggage. The primary reactor heat exchanger did not foul until after 70 hours of continuous operating, as opposed to normally about four heat exchanger foulings per week with sodium-containing feeds in the absence of tall oil. The circulation rates through the reactor heat exchanger were greater than when operating without tall oil, indicating that tall oil had a beneficial effect on the fluidity of the hot reaction mass.

The tetrahydrofuran produced was analyzed by gas chromatography and found to be identical with material produced without tall oil. The amount of 1,4-butanediol left unconverted in the system was again only 0.5 percent of that fed to the system.

Although the invention has been described and exemplified by way of specific embodiments, it is not intended

We claim:

1. In the method of converting 1,4-butanediol to tetrahydrofuran by the reaction of a feed stream containing, by weight, 1 to 20 percent water, 80 to 99 percent 1,4-butanediol, and 0.05 to 5 percent combined high boiling organic tars and alkali or alkaline earth salts with 5 to 25 percent by weight sulfuric acid, the improvement which comprises adding tall oil containing less than 95 percent by weight of fatty acids and having an acid number of less than 195 to the reaction in an amount sufficient that the reaction medium contains 2 to 60 percent by weight of tall oil.

2. The method of claim 1 in which the tall oil contains less than 90 percent by weight of fatty acids and has an acid number of less than 190.

3. The method of claim 2 in which the tall oil has an acid number of less than 185.

4. The method of claim 1 in which the feed stream contains 3 to 6 percent water, 94 to 97 percent 1,4-butanediol, and 0.5 to 3 percent combined high boiling organic tars and alkali or alkaline earth metal salts, the sulfuric acid concentration is 6 to 15 percent, and the reaction medium contains 10 to 40 percent by weight of tall oil.

5. The method of claim 4 in which the tall oil contains less than 90 percent by weight of fatty acids and has an acid number of less than 190.

6. The method of claim 5 in which the tall oil has an acid number of less than 185.

7. In the method of converting 1,4-butanediol to tetrahydrofuran by passing a butanediol feed stream containing, by weight, 5 to 25 percent sulfuric acid, 30 to 70 percent 1,4-butanediol, 1 to 50 percent combined high boiling organic tars and alkali or alkaline earth metal salts, and 1 to 30 percent water through a wiped film evaporator, the improvement which comprises adding tall oil containing less than 95 percent by weight of fatty acids and having and acid number of less than 195 to the evaporator in an amount sufficient that 2 to 60 percent by weight of the total feed to the evaporator is tall oil.

8. The method of claim 7 in which the tall oil contains less than 90 percent by weight of fatty acids and has an acid number of less than 190.

9. The method of claim 8 in which the tall oil has an acid number of less than 185.

10. The method of claim 7 in which the butanediol feed stream contains 6 to 15 percent sulfuric acid, 40 to 60 percent 1,4-butanediol, 10 to 40 percent combined high boiling organic tars and alkali or alkaline earth metal salts, and 5 to 20 percent water, and the total feed to the evaporator contains 10 to 40 percent by weight of tall oil.

11. The method of claim 10 in which the tall oil contains less than 90 percent by weight of fatty acids and has an acid number of less than 190.

12. The method of claim 11 in which the tall oil has an acid number of less than 185.

13. The method of converting 1,4-butanediol to tetrahydrofuran which comprises charging to a reactor under reflux a butanediol feed stream containing, by weight, 3 to 6 percent water, 94 to 97 percent 1,4-butanediol, and 0.5 to 3 percent combined high boiling organic tars and alkali or alkaline earth metal salts, sulfuric acid in an amount sufficient to provide the reaction medium with a sulfuric acid concentration of 6 to 15 percent by weight, and tall oil containing less than 90 percent by weight of fatty acids and having an acid number of less than 190 in an amount sufficient that the reaction medium contains 10 to 40 percent by weight of tall oil, continuously recovering tetrahydrofuran and water as an overhead stream from the reactor, continuously removing from the reactor a purge stream in an amount sufficient to maintain the concentration of combined high boiling organic tars and inorganic salts in the reaction medium at 10 to 40 percent by weight, continuously charging said purge stream to a wiped film evaporator under conditions such that 50 to 90 percent of the 1,4-butanediol charged to the wiped film evaporator is converted to tetrahydrofuran, continuously removing tetrahydrofuran and water as an overhead stream from the wiped film evaporator and recycling said overhead stream to the reactor, and continuously withdrawing high boiling organic tars and inorganic salts from the wiped film evaporator.

14. The method of claim 13 in which the tall oil has an acid number of less than 185.

References Cited

UNITED STATES PATENTS 2,686,817  7/1954  Capes et al. _____ 260—346.1 R

DONALD G. DAUS, Primary Examiner

B. DENTZ, Assistant Examiner